US006419807B1

(12) United States Patent
Davies et al.

(10) Patent No.: US 6,419,807 B1
(45) Date of Patent: Jul. 16, 2002

(54) SENSOR ARRAY FOR DETECTING ELECTRICAL CHARACTERISTICS OF FLUIDS

(75) Inventors: Graham Arthur Davies, Macclesfield; Tomasz Dyakowski, Sale; Arthur Jerzy Jaworski, Manchester, all of (GB)

(73) Assignee: University of Manchester Institute of Science & Technology, Manchester (GB)

( * ) Notice: Subject to any disclaimer, the term of this patent is extended or adjusted under 35 U.S.C. 154(b) by 0 days.

(21) Appl. No.: 09/485,201

(22) PCT Filed: Jul. 29, 1998

(86) PCT No.: PCT/GB98/02271

§ 371 (c)(1),
(2), (4) Date: Jul. 18, 2000

(87) PCT Pub. No.: WO99/06891

PCT Pub. Date: Feb. 11, 1999

(30) Foreign Application Priority Data

Aug. 2, 1997 (GB) .............................................. 9716323

(51) Int. Cl.[7] .............................................. G01N 27/00
(52) U.S. Cl. .......................... 204/406; 204/412; 210/85; 324/425; 324/437
(58) Field of Search ................................ 204/400, 406, 204/412; 210/85, 96.1; 324/425, 437

(56) References Cited

U.S. PATENT DOCUMENTS

| 4,225,410 A | * | 9/1980 | Pace |
| 5,405,510 A | * | 4/1995 | Betts et al. .................. 204/412 |
| 5,483,164 A | * | 1/1996 | Moss et al. .................. 204/412 |

* cited by examiner

*Primary Examiner*—Joseph W. Drodge
(74) *Attorney, Agent, or Firm*—Woodard, Emhardt, Naughton Moriarty & McNett

(57) ABSTRACT

A sensor array for detecting the distribution of fluids having different electrical characteristics, comprising a multilayer structure including a first layer which defines an array of spaced apart sensor electrodes, a second layer separated from the first layer by dielectric material and defining a conductive screen, and a third layer separated from the second layer by dielectric material and defining a series of spaced apart elongate connections, each sensor being connected to a respective connection by a respective conductive path extending through an opening in the conductive screen defined by the second layer.

8 Claims, 12 Drawing Sheets

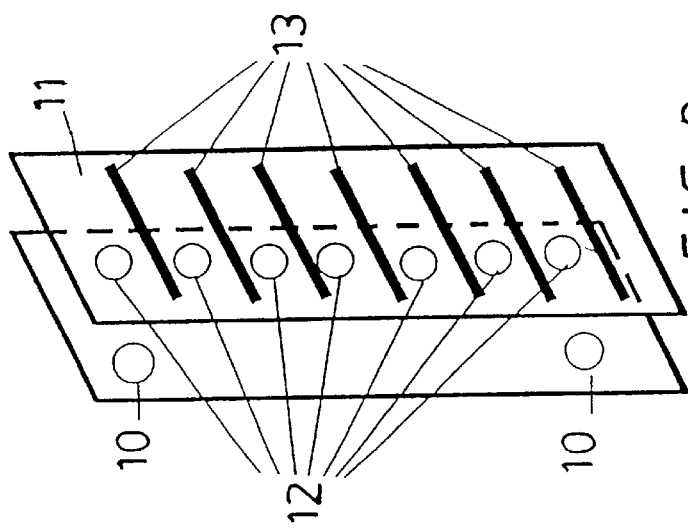
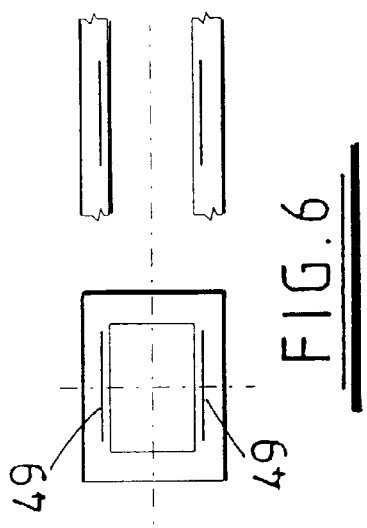
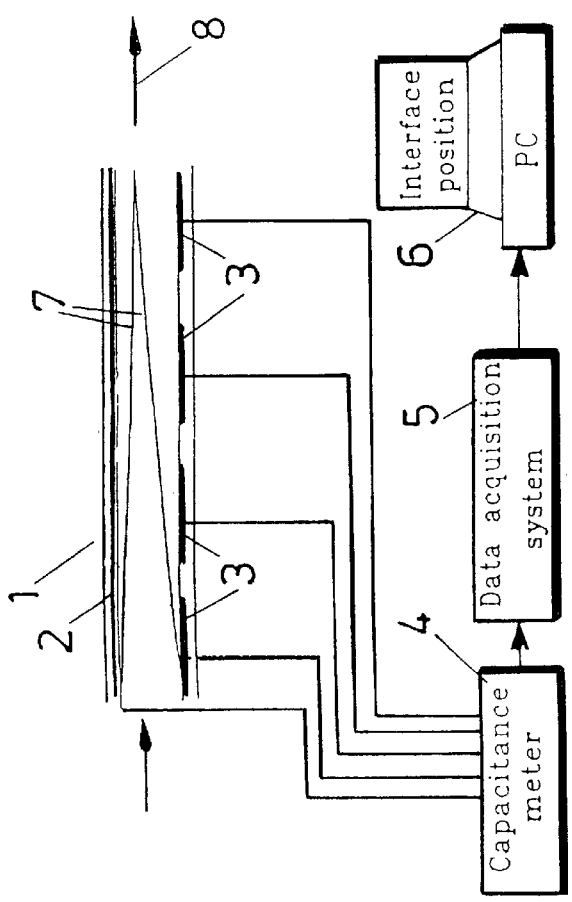
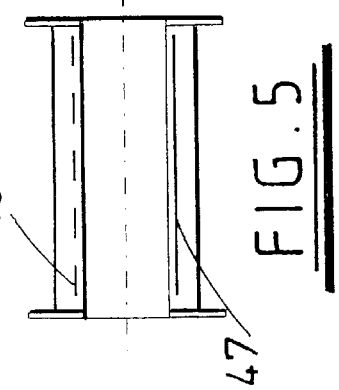
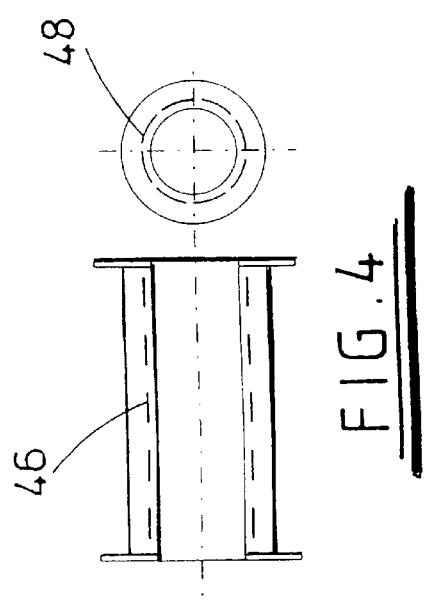

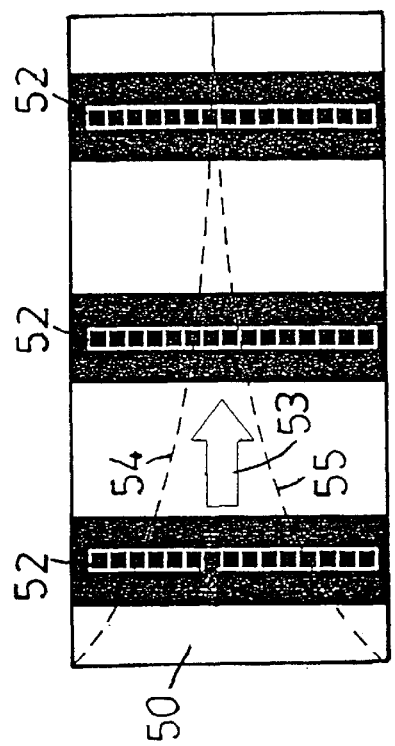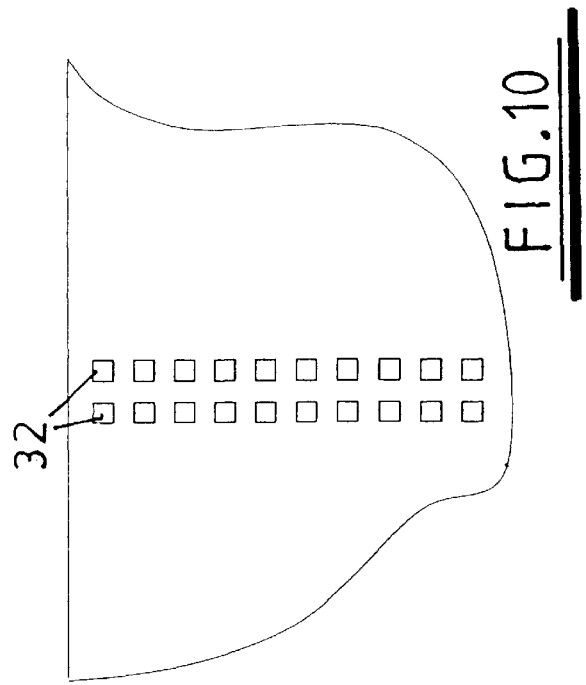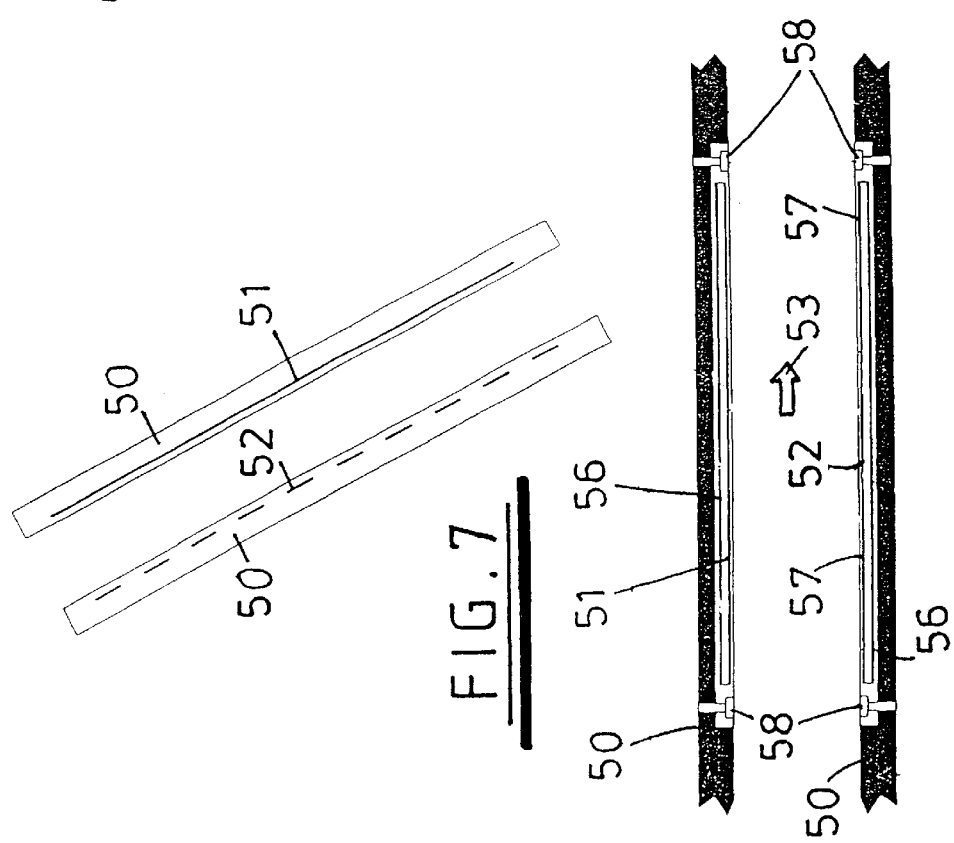

example of "ring" electrodes with
a possible choice of electrode switching example of rectangular electrodes "conventional" electrode
arrangement with a "V" configuration cross-section through the sandwich

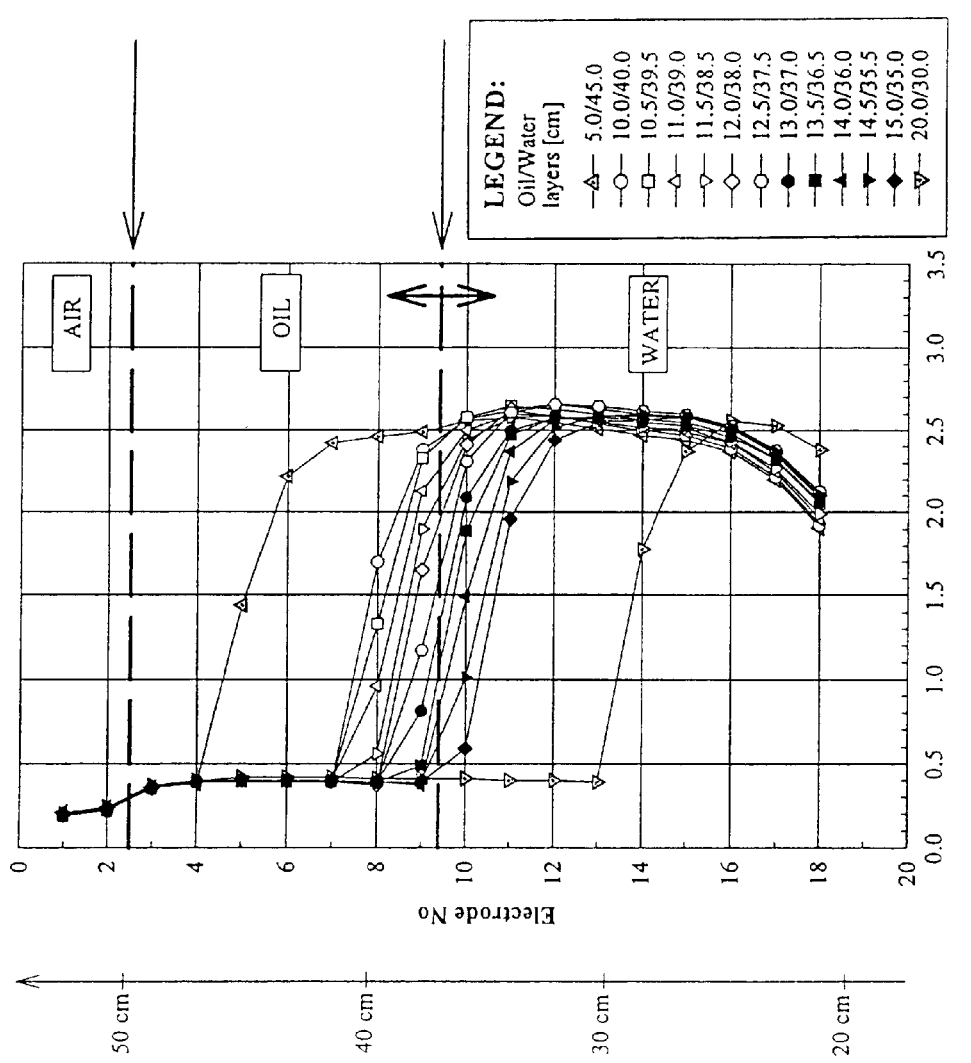

SENSOR ARRAY FOR DETECTING ELECTRICAL CHARACTERISTICS OF FLUIDS

This application is a 371 of PCT/GB98/02271, filed on July 29, 1998.

BACKGROUND OF THE INVENTION

The present invention relates to a flow control system, and in particular to a system for controlling the flow of a mixed phase fluid through a vessel. The term "mixed phase fluid" is used to cover fluids made up of for example suspended particulates, liquids emulsions and gas derived from different constituents for example oil and water, or liquid and gas derived from the same constituent.

Oil field production systems generally comprise separator plant in which raw fluid pumped from an oil bearing formation is separated into its constituent parts, that is volatile gases, liquid petroleum products, water and particulates. The nature of the input fluid to the separator plant can vary widely over relatively short periods of time. For example a large proportion of the flow may be made up of water for a first period of time and oil and gas for a second period of time. It is difficult with a separator of fixed configuration to satisfactorily process different flows when flow conditions change in an unpredictable manner.

In a conventional separator, an inlet flow is generally passed through a stack of inclined plates within a relatively large vessel, the inclined plate encouraging the separation of water, oil and gas into separate superimposed layers. Gas can then be extracted from an upper section of the separator vessel and the water and oil can be separated by a simple weir separator plate the height of which is arranged to be above the interface between the water and oil layers. If the input flow is such that the separator plates become largely filled with a foam or emulsion of for example oil and water the separation performance is significantly degraded. Similarly, if a large volume of water is delivered to the separator in a relatively short period of time, it can be difficult to maintain the water/oil interface below the level of the weir separator.

With such problems in mind, the normal approach to separator design has been to provide a relatively large capacity separator which is capable of dealing with a wide range of conditions by in effect accepting wide fluctuations in separator plate efficiency and water/oil interface levels. As a result of this design philosophy, separator plant can make up a significant proportion of the size and weight of oil field equipment. This is a particular problem in the case of offshore oil fields where the size and weight of offshore equipment determines the economic viability of some oil bearing formations.

Attempts have been made to monitor separator performance in particular circumstances so as to be able to match separator design to expected separator operating conditions. The equipment used has generally required the mounting of heavy gamma ray sensors on separator equipment. The use of such equipment for monitoring routine operating conditions is not appropriate.

Extensive work has been conducted to enable flow conditions within for example circular-section pipes to be monitored. For example, U.S. Pat. No. 5,130,661 describes a capacitance sensor system in which an array of capacitor plates is disposed around the outer periphery of a pipe through which a mixture of oil, water and gas is passing. By appropriate manipulation of output signals derived from the sensors, an image can be built up of the flow cross-section. Such sensing systems have been used for example to estimate mass flow rates of different phases but it has not been suggested that the output of such systems can be used to achieve real-time process control.

SUMMARY OF THE INVENTION

It is an object of the present invention to provide a fluid flow control system which obviates or mitigates the forementioned problems.

According to the present invention, there is provided a system for controlling the flow of a mixed phase fluid through a vessel, comprising at least one flow control device located in an Inlet to or outlet from the vessel, a plurality of sensors distributed about the vessel to sense characteristics of the flow adjacent the sensors, means for monitoring outputs of the sensors to detect the location of a boundary between phases within the flow, and means for controlling the flow control device to maintain the boundary location within pre-determined limits.

The present invention may be applied to the control of processes such as inclined plate separation and weir plate separation. The supply of fluid to or the extraction of different phases from the vessel can be controlled so as to maintain interfaces between different phases at desired levels. For example, in the case of a weir plate, used to separate water and oil, the rate at which water is removed can be controlled to maintain the water/oil interface above a water outlet and below an upper edge of the weir. Similarly, the supply of fluid to an inclined plate separator can be controlled to prevent the separator becoming ineffective for example as the result of the build-up of emulsions between the plates.

Preferably the sensors are embedded in vessel surfaces adjacent to which the fluid flows, for example in the surfaces of the plates of inclined plate or weir plate separators. The sensors may be capacitance sensors, pressure sensors or conductivity sensors for example. In the case of an inclined plate separator, the sensors may be supported in for example three vertical arrays, the arrays being spaced apart in the directions of fluid flow through the separator.

The sensors may be provided in a multilayer structure comprising a top layer of conductance sensors, a screening layer, and a layer carrying a series of connections, each layer being separated from the other by dielectric material, conducting paths between the sensors and the connections passing through the screening layer. This arrangement is advantageous because it avoids "cross-talk" between the sensors and the connections. This makes conductance measurements more accurate, and allows some sensors to be used as sources of electric fields whilst other sensors are simultaneously used as detectors of electric fields.

The screening layer preferably comprises a layer of conducing material. Screening conducting material is preferably located between the connections to prevent cross-talk between the connections. A most preferably way of providing the multi-layer structure is by bonding together a series of printed circuit boards.

The sensors may be supported in a vertical array, for example at vertically spaced positions on a weir separator, or at vertically spaced positions on an elongate support extending vertically through the fluid flow. The sensors may be arranged to have a common axis or lie in a common plane, so that measurements of electrical properties are made between adjacent sensors.

The elongate support may comprise a rod having two faces subtending an angle of less than 180 degrees, the faces being provided with an array of sensors. This is advantageous over known configurations of sensors because it reduces the possibility of solid material becoming trapped between opposing sensors.

Preferably, at least one sensor is capable of acting either as a source of an electric field or as a detector of an electric field. Providing each of the sensors with this capability allows the distribution of detectors and sensors to be optimised for any required measurement.

Preferably, at least one of the sensors is located on a dielectric mounting. Where the dielectric mounting forms a casing in one surface of which a sensor is located, an electric field obtained by applying a voltage to that sensor will retain its general shape in the event that the permittivity of the media surrounding the casing is increased.

Preferably, at least one of the sensors is separated by dielectric material from an electrical connection to another of the sensors. This allows some sensors to be used as detectors and some to be used as sources of electric fields.

The sensors may control for example a device for injecting flow control chemical additives, or a flow choke device. Such a flow choke device may be located upstream from or downstream from a T-junction defining one inlet and two outlets, the flow choke being controlled to control separation processes occurring at the junction Thus an inlet flow to for example an inclined plate separator can be pre-conditioned by diverting at least a proportion of unwanted components away from the inclined separator at a T-junction located upstream of that separator.

The invention also provides a system for monitoring the flow of a mixed phase fluid through a vessel the vessel defining surfaces adjacent to which the fluid flows, wherein sensors are embedded in the said surfaces, each sensor providing an output representative of a characteristic of the flow adjacent the surface within which it is embedded, and the sensors being distributed within the said surfaces such that the location relative to the vessel of a boundary between phases of a flow can be determined from a comparison between the sensor outputs.

The invention also provides a method of calibrating an array of sensors configured to monitor the location of a boundary between layers of fluid, the method comprising obtaining a series of measurements from two of the sensors while the boundary between the layers of fluid is at a series of locations between central areas of the sensors. Once the array of sensors has been calibrated for a given fluid or fluids, the position of the boundary between the layers of the fluid or fluids can be very accurately determined.

BRIEF DESCRIPTION OF THE DRAWINGS

Embodiments of the present invention will now be described by way of example, with reference to the accompanying drawings, in which;

FIG. 1 is schematic representation of a sensor array capable of monitoring the separation of an oil-water mixture;

FIG. 2 is a schematic representation of a vertical array of capacitance and pressure sensors which can be used to monitor the position of an interface between components of an oil-water mixture:

FIGS. 4, 5 and 6 each show vertical axial sections and vertical transverse sections through three alternative flow sensing assemblies;

FIG. 7 schematically illustrates the distribution of capacitance sensor components in two adjacent plates of an inclined plate separator such as that incorporated in the structure illustrated in FIG. 3;

FIG. 8 illustrates in further detail the disposition of the sensor arrangement shown in FIG. 7;

FIG. 9 illustrates the structure of FIG. 8 in greater detail;

FIG. 10 represents the disposition of two vertical arrays of sensors in the weir plate separator of FIG. 3;

FIG. 22 is a graph representing a number of capacitance profiles obtained using array comprising a series of electrodes whilst an interface between two media was traversed across the separator vessel of FIG. 20.

DETAILED DESCRIPTION OF THE INVENTION

Figure 3:
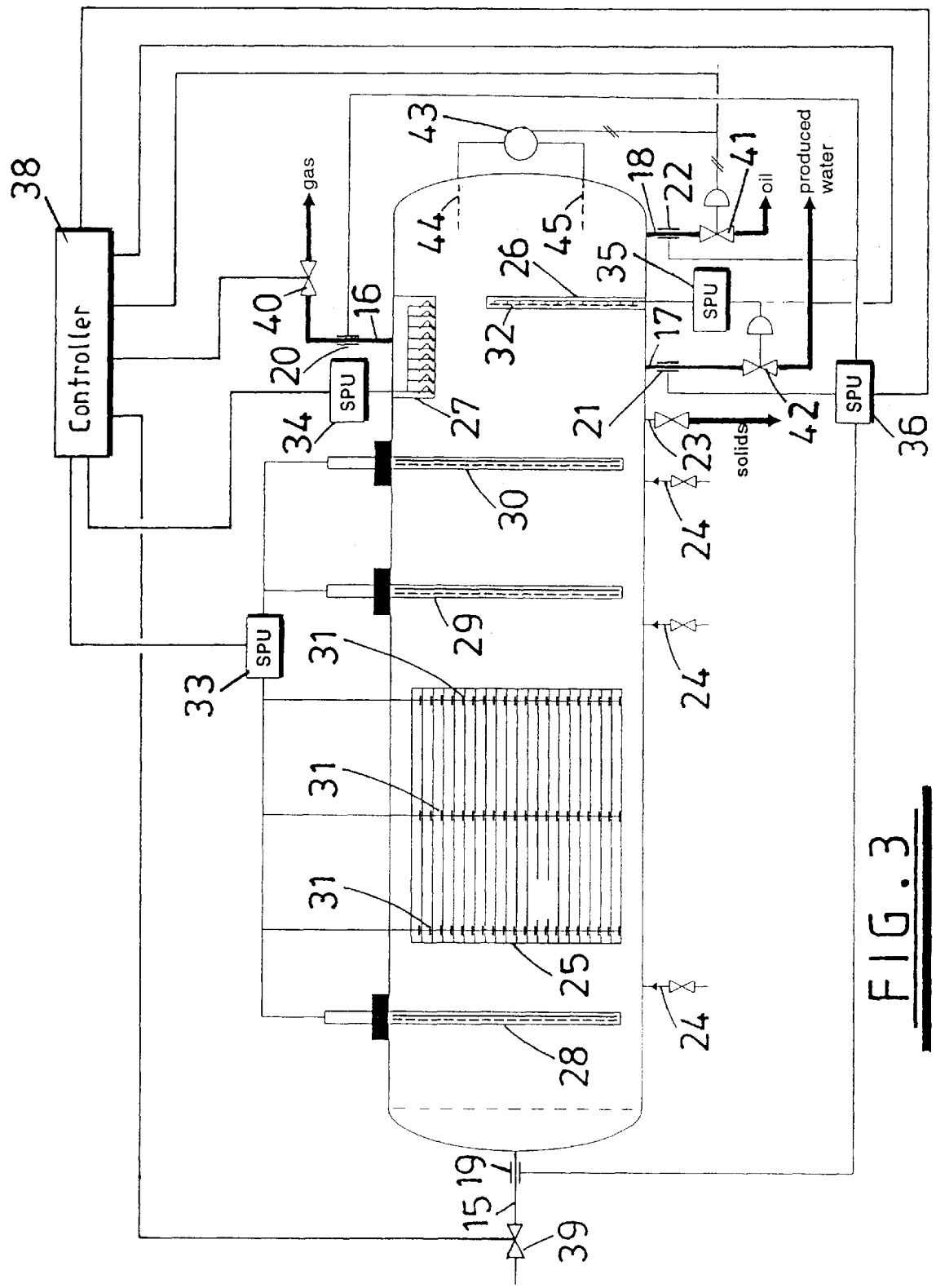
FIG. 3 is a schematic illustration of a separator vessel incorporating inclined plate and weir plate separators.

Referring to FIG. 1, the illustrated system comprises a rectangular section pipe 1 within a upper section of which is embedded a source electrode 2. Four detection electrodes 3 are embedded in axially spaced lower portions of the pipe 1. Signals detected at the electrodes 3 are delivered to a capacitance meter 4 the output of which is applied to a data acquisition system 5. The output of the data acquisition system 5 is applied to a computer 6 which produces an estimate of the position of an interface 7 between oil and water components of the flow (represented by arrow 8) within the pipe 1.

It will be appreciated that the position of the interfaces 7 within the pipe will vary over time and the resulting changes in the dielectric coefficient of the region between each electrode 3 and the source electrode 2 will vary. Such variations enable an estimate to be made of the relative volumes of the different phases passing through the pipe 1.

FIG. 2 is schematic illustration of a sensor array which can be used to monitor the location of an interface between different phases in a relatively large vessel across which the illustrated array extends. The illustrated arrangement comprises a support 9 on which thermocouples 10 are positioned to enable temperature compensation of sensor outputs to be achieved. Mounted on the support 9 is a sub-assembly 11 supporting a vertically spaced array of piezoelectric pressure transducers 12 and a vertically spaced array of embedded capacitance sensors 13. If the array is immersed in a vessel containing two vertically separated layers of for example oil and water, outputs from the sensors enable an estimate to be made of the vertical position of the interface between the different layers.

Referring now to FIG. 3, this schematically represents a separator for use in the separation of water, oil and gas components from an oil well production flow The separator comprises a containment vessel 14 having an inlet 15, a gas outlet 16, a produced water outlet 17, and an oil outlet 18. Pipe sensors for example of the type illustrated in FIG. 1 are represented as component 19 on the inlet 15 and components 20, 21 and 22 on the outlets 16, 17 and 18. A further outlet 23 is provided for the discharge of accumulated solids, and inlets 24 are provided to enable the agitation of deposited solids. Solids will generally be discharged periodically and therefore the dynamic control of the output 23 and input 24 is not required. This feature of the operation of the separator will not therefore be further described herein.

The separator vessel 14 houses an inclined plate separator 25, a vertically extending weir plate separator 26, an oil/gas separator 27 and three sensor arrays 28, 29 and 30. With the exception of the instrumentation supported on the units, the separators 25, 26 and 27 are conventional. The sensor arrays 28, 29 and 30 are of the general type described with reference to FIG. 2. The separator plates 25 support three vertical arrays 31 of capacitance sensors. The weir plate separator 26 supports two vertical arrays of capacitance sensors 32, and angled plates in the separator 27 each support a capacitance sensor. The various sensing assemblies are connected by signal processing units 33, 34, 35 and 36 to a controller 38 which in rum is arranged to control valves 39, 40, 41 and 42 provided on the inlet and gas, oil and water outlets respectively. The valve 42 can also be controlled directly by the signal processing unit 35 such that if the oil/water interface on the upstream side of the weir plate 26 rises above a predetermined level the valve 42 is open to discharge water. Similarly, the valve 41 can be directly controlled by a level gauge 43 which discharges oil through valve 41 automatically if the oil/gas interface exceeds an upper sensing level 44 and closes the valve 41 automatically if the oil/gas interface falls below a sensing level 45.

The sensor arrays 31 within the plate separator 25 enable the interface between any flow of emulsion separating water and oil to be accurately located. The sensor arrays 28, 29, 30 and 32 make it possible to monitor the efficiency of the separation process in the direction of flow through the separator. This information is delivered to the controller 38 which then ensures the appropriate control of the inlet and outlet valves to maintain appropriate flow and pressure conditions to prevent undesirable circumstances developing, for example a circumstance such that significant volumes of emulsion are present in the separator downstream of the inclined plate separator 25.

FIG. 4 shows the detailed structure of one possible pipe sensor which differs slightly from that of FIG. 1. In the arrangement of FIG. 4, five rings each of eight plates 46 are disposed around the axis of a short flanged pipe insert. Appropriate signals may be applied to the plates 46 so as to derive the necessary capacitance measurements. In the arrangement of FIG. 5, which is similar to that shown in FIG. 1, a single lower plate 47 is located opposite five upper plates 48. In the embodiment of FIG. 6 a rectangular section channel is defined having single plates 49 in upper and lower walls.

FIG. 7 illustrates the sensor structure in two adjacent plates 50 of the inclined plate separator 25 of FIG. 3. One plate carries a continuous excitation source conductor 51 which faces an array of sensor electrodes 52. FIG. 8 is a front view of the plate 50 carrying the electrodes 52. Electrodes 52 are surrounded by a guard electrode 52a to obtain a uniform electrical field in front of the detecting electrodes 52, between source (not shown in FIG. 8) and, detecting electrodes 52. Assuming a flow of oil, oil-water emulsion and water in the direction of arrow 53, the interface between the emulsion and oil may be located as indicated by broken line 54 and the interface between the emulsion and water may be located as indicated by broken line 55. It will be appreciated that signals derived from sensors located adjacent the body of emulsion will be substantially different from signals derived from electrodes adjacent either the oil or water phases.

The controller 38 of FIG. 3 is set up to monitor changes in the location of the interfaces 54 and 55 as shown in FIG. 8 so as to prevent a substantial proportion of space between the inclined separator plates becoming filled with emulsion.

FIG. 9 shows one structural assembly which can be used to achieve sensing electrode arrays of the type described-with reference to FIG. 7 and 8. Each of the plates comprises an electromagnetic shield 56 and each of the spaced detection electrodes 52 is surrounded by a guard electrode 57. The electrodes may be in the form of conductive areas supported by a printed circuit board and housed within an epoxy resin insert secured to the plates 50 by screws 38. The plates could be formed from GRP.

FIG. 10 shows two vertical arrays of sensing electrodes 32 which are provided in the weir plate 26 of FIG. 3. Each array may be independently monitored so as to provide comparative outputs between any vertically aligned pair and any vertically adjacent pair, thereby enabling the detection of any operational fault which might compromise the response of the system to the oil/water interface approaching either the top of the weir or the outlet 17.

Figure 11:
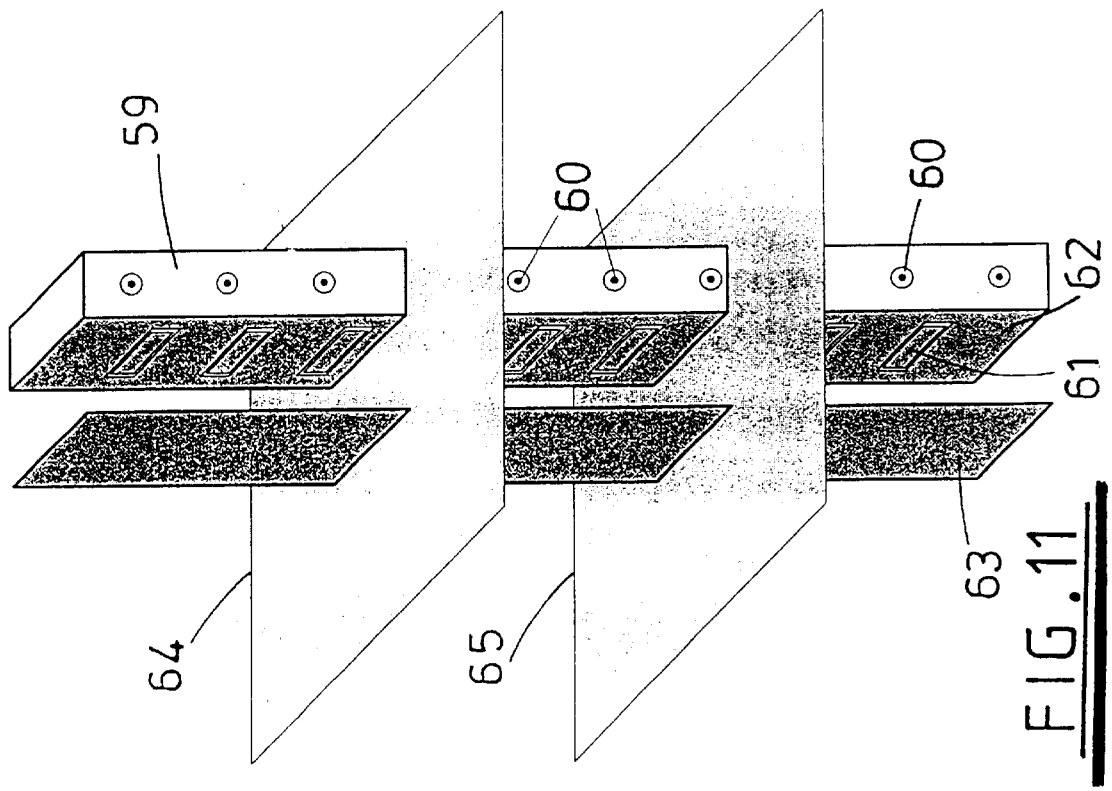
FIG. 11 illustrates a vertically extending structure of a type incorporated in the arrangement of FIG. 3.

FIG. 11 illustrates in greater detail the structure of a sensor array of the type illustrated generally in FIG. 2 and used to define the sensor arrays 28, 29 and 30 in FIG. 3. The illustrated assembly comprises an elongate support 59 incorporating a vertical array of pressure ports 60 each coupled to a piezoelectric pressure sensor (not shown). The support 59 also supports an array of detection electrodes 61 surrounded by guard electrode 62. A source electrode 63 is also mounted on the support 59 spaced from the detection electrodes 61 such that the space between the electrodes is filled by the fluid within the separator. One possible location for an oil-emulsion interface is indicated by plane 64, and one possible location for an emulsion-water interface is indicated by plane 65. It will be appreciated that monitoring the outputs of the pressure and capacitance sensing transducers will enable the location of the interfaces 64 and 65 to be accurately determined and thereby enable the appropriate control of the overall process to ensure that the interfaces 64 and 65 are maintained within acceptable limits.

Figure 12:
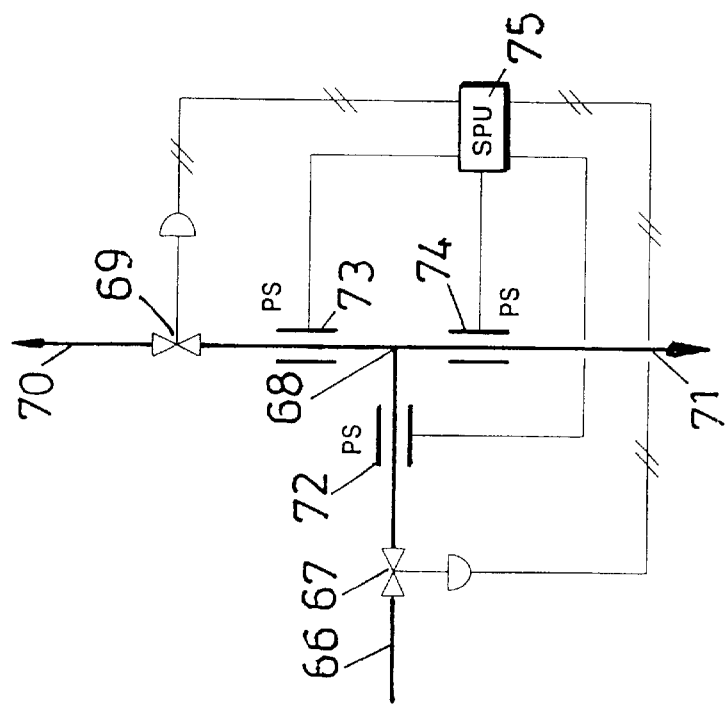
FIG. 12 illustrates control arrangement for a T-junction separator stage which may be incorporated upstream of the separator assembly of FIG. 3.

Referring now to FIG. 12, this shows a T-junction initial separator which may be connected to the separator illustrated in FIG. 3 upstream of the inlet 15. An inlet 66 is coupled through a valve 67 to a T-junction 68 that is coupled by a valve 69 to an outlet 70 and is coupled directly to an outlet 71. Flow sensors 72, 73 and 74 for example of the type describe with reference to FIG. 4 are located on the inlet to and the outlets from the T-junction 68. Outputs from those sensors are processed in a signal processing unit 75 which controls the valves 67 and 69.

It is known that supplying an oil/water mix to a T-junction as described in which the two outlets are directed in vertically opposite directions results in some separation of the two components, water tending to flow vertically downwards and oil tending to flow vertically upwards. The present invention enables this known effect to be optimised by controlling the flow to and back pressure within the T-junction 68 by appropriate modulation of the control applied to the valve 67 and 69.

This document does not contain detailed formula linking inputs to the signal processing units and consequential valve control outputs. Detailed control algorithm will be required which will differ between different applications. To further explain the underlying design philosophy however, relevant conditions which might apply in a three phase separator such as that illustrated in FIG. 3 are discussed below.

The inlet flow sensor 19 provides information on the relative quantities of the various phases flowing at any one time into the separator. Control actions might be applicable if for example large slugs of water enter the vessel.

The vertically extending sensor arrays 28, 29 and 30 are distributed along the direction of flow through the separator, one (28) being between the inlet and the plate separator and enabling the efficiency of the flow distribution system to be monitored. If the flow distribution system becomes partially blocked by solids then the mass flux across the separator vessel would change and this could adversely affect the separation process in the rest of the unit. It would be possible to detect the development of such conditions from the upstream array 28. The two downstream arrays 29 and 30 make it possible to monitor the position and depth of any heterogeneous layers such as emulsions between oil and water, and foam between gas and oil phases. These heterogeneous layers are sometimes transitory and build up locally in the vessel particularly towards the weir plate 26. If an array of sensors is embedded in the weir plate itself as shown by electrodes 32 in FIG. 3, his gives additional information as to the position of various phase boundaries at the downstream end of the separation system. The outputs from the two vertical arrays 29 and 30 and the weir plate 26 enable optimised control of the water outlet valve 42. Signals from the weir plate sensor electrodes 32 would be particularly useful to produce alarm signals should the heterogeneous liquid-liquid or indeed the produced water layer itself rise to be near the top of the weir plate. If this condition developed then entrainment of water in the separated oil would increase rapidly. The instrumentation downstream of the plate separator 25 would enable such conditions to be avoided.

Within the separator plate assembly 25, the three vertically aligned arrays of electrodes 31 make it possible to obtain an indication of the mass flux distribution entering the plate system. It would also indicate if solids began to build up in the vessel upstream of the plate assembly and within the plate assembly itself. It will be appreciated that if solids start to build up between the separator plates separation efficiency will be rapidly degraded. The present invention provides real time measurements initiative of solids accumulation in the system.

With in the inclined plates separator, the axial separation of the three arrays of sensor electrodes 31 makes it possible to monitor the separation process in the axial direction. Two conditions which could develop and which would give rise to a loss of separation efficiency are choking, that is local build-up of one of the phases, and instability, that is instability of the interface between water and oil in the individual channels defined between adjacent plates. Both conditions give rise to rapid entrainment of the discontinuous phase and a fall in overall separation performance. These conditions can be monitored with the sensor electrode arrays as shown. By analysing the output of all the various sensor arrays, a control strategy can be developed to maintain operation within a pre-defined desirable envelope.

The incorporation of sensors in the otherwise conventional separator 27 which is provided on the gas outlet to eliminate mist, enables any build-up in liquid within the separator to be detected. If liquid builds up then the probability of mist entrainment in the gas outlet increases. Entrainment of liquid in the gas leaving the vessel can produce serious processing and safety conditions in downstream processes.

Although the controller 38 as described with reference to FIG. 3 is only used to control inlet and outlet valves, it will be appreciated that the controller may also be used to control the injection of chemicals to enhance phase separation, for example, by inhibiting the formation of emulsions and foams.

Figure 13:
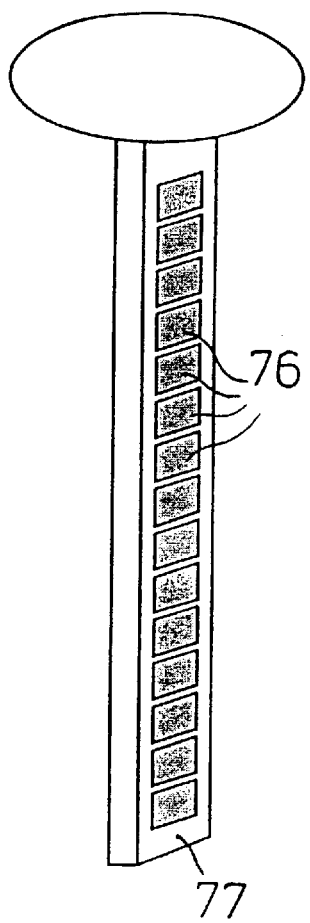
FIG. 13 illustrates a specific configuration of a vertical array of sensors of the type which is shown schematically in FIG. 2.

The sensor arrangement shown in FIG. 2, and as 28, 29 and 30 in FIG. 3, can be replaced by an alternative arrangement shown in FIG. 13. A series of sensors in this case are electrodes 76 for measuring capacitance. Contrary to the conventional arrangement of sources spaced apart from parallel detectors which allow fluid to flow between them, the electrodes 76 are arranged on a single surface 77. This avoids the possibility of solid matter becoming trapped between the electrodes 76. Each electrode 76 can be used as either a source (of an electric field) or a detector (of the electric field) by appropriate switching circuitry, and capacitance is measured between pairs of electrodes (probably adjacent electrodes, but not necessarily).

Figure 14:
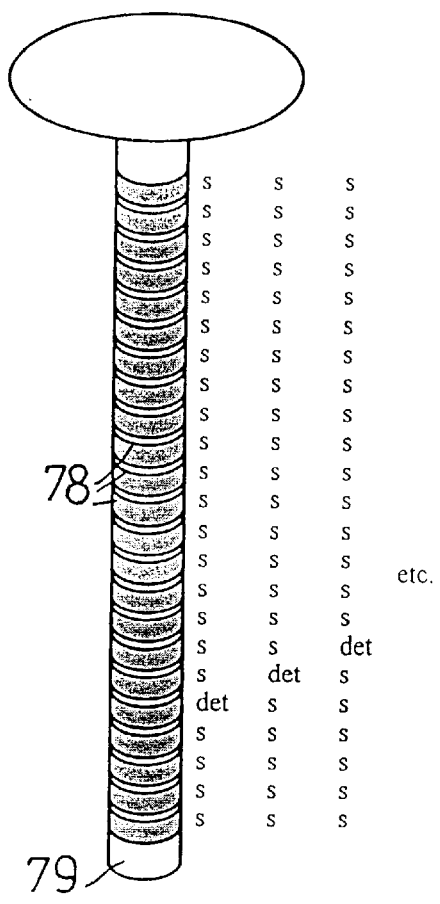
FIG. 14 illustrates an alternative configuration of a vertical array of sensors of the type which is shown schematically in FIG. 2.

An alternative configuration of sensor array is shown in FIG. 14. The electrodes of this array comprise a series of rings 78 disposed at regular intervals along a rod 79. One possible mode of operation of the array is illustrated schematically, wherein each of the rings 78 labelled 's' acts as a source and the ring 78 labelled 'det' acts as a detector.

Figure 15:
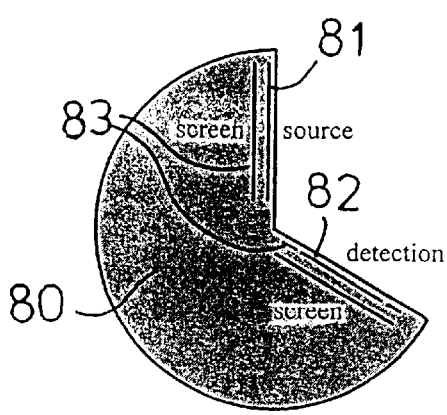
FIG. 15 is a cross-sectional view of an alternative configuration of a vertical array of sensors of the type which is shown schematically in FIG. 2.

FIG. 15 illustrates a further alternative configuration of sensor array. A 'V' shape is cut into a rod 80, and a source 81 is positioned in one face and a series of detectors 82 is spaced along the other face of the 'V'. This sensor array is conventional in that it comprises a single source 81 which is not capable of acting as a detector and a series of detectors 82 spaced away from the source 81, which detectors are not capable of acting as a source. This array configuration is advantageous over known conventional configurations in that solid material is unlikely to become trapped between the faces of the 'V'. A typical angle subtended by the faces of the 'V' is 120 degrees. Screens 83 are located behind the sources 81 and the detectors 82.

Figure 16:
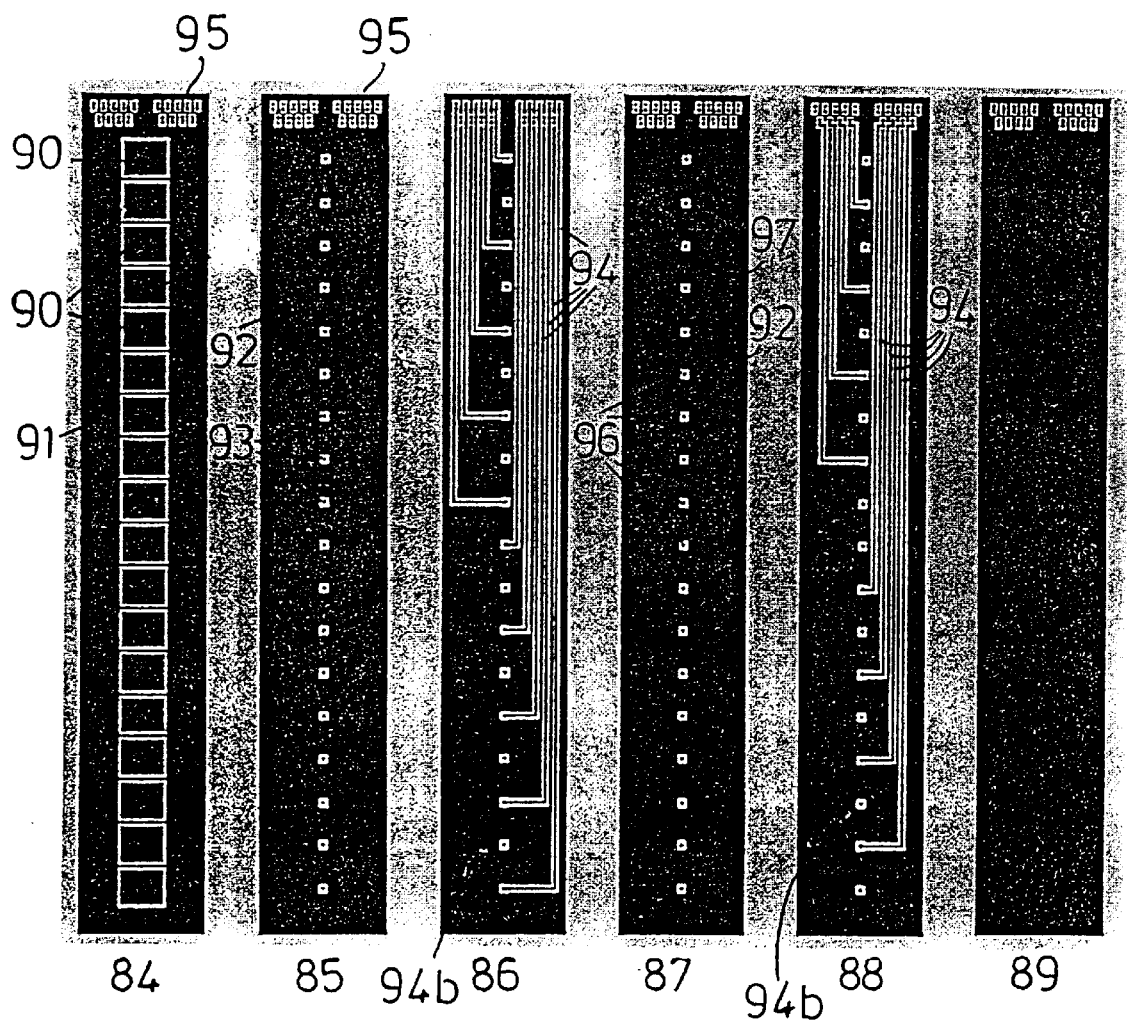
FIG. 16 illustrates a series of layers which together comprise a vertical array of sensors of the type which is shown schematically in FIG. 2.
Figure 17:
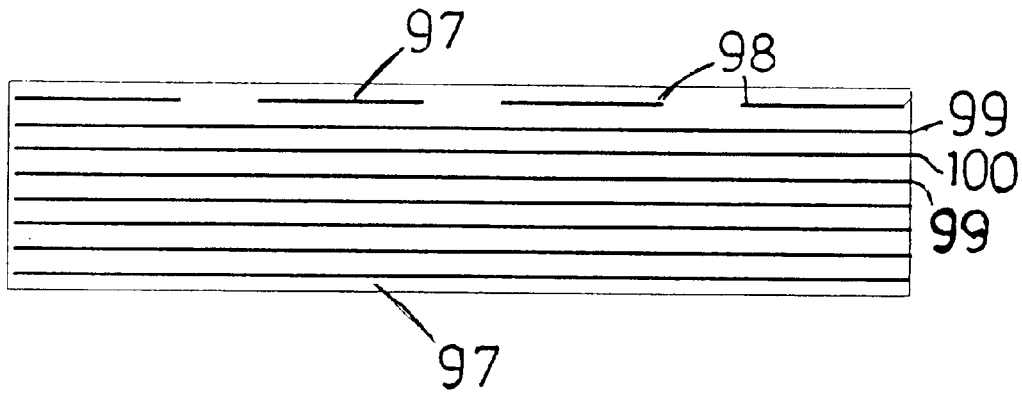
FIG. 17 illustrates schematically a cross-section of a series of layers which together comprise a vertical array of sensors of the type which is shown schematically in FIG. 2.

An array of electrodes which has minimal undesired "cross-talk" effect between electrodes and connections to electrodes is illustrated in FIG. 16. The way comprises six layers of printed circuit board (PCB) 84–89 which are bonded on top of one another as shown in FIG. 17. The dark (solid) regions in FIG. 16 correspond to conducting material.

A first of the layers 84 of the array comprises a series of electrodes 90 surrounded by a guard electrode 91. A second layer 85 comprises a shielding conductor 92, with electrical connections 93 leading to signal carrying connections in further layers of the array.

A third layer 86 contains signal carrying connections 94 and a shielding conductor (94b) which prevents "cross-talk" between connections 94 in the third layer 86. In the present example, layer 86 allows connections from 10 electrodes 90 of layer 84, via electrical connections 93 in the second layer 85 to "soldering points" 95 at an upper end of the third layer 86.

A fourth layer 87 is essentially the same as layer 85. It shields the third layer 86 from a fifth layer 88 but provides electrical connections between electrodes 90 and signal carrying connections 94 in the fifth layer 88.

The fifth layer 88 is conceptually similar to the third layer 86 and provides connections from eight remaining electrodes 90 to the "soldering points" 95 at an upper end of the layer 88. The signal carrying connections 94 are shielded from one another by conductor 94b. The sixth layer 89 serves as a shield between layer 88 and an external environment.

In general, for capacitance measuring electrodes, when the surface area of a connection to a given electrode becomes comparable to the surface area of that electrode, the measured capacitance will be influenced by the connection. When a conventional 'dipstick' arrangement of electrodes is immersed in a medium of given permittivity, each electrode should measure the same capacitance. However, the effect of the surface areas of the electrode connections is such that those electrodes near a lower end of the dipstick will measure a greater capacitance than those near an upper end of the dipstick. Tie array of electrodes illustrated in FIGS. 16 and 17 avoids this problem by shielding the electrodes 90 from the signal carrying connections 94, and the signal carrying connections 94 from one another. Efficient shielding is provided by the conducting plates 92 of the second 85 and fourth 87 layers of the array, which prohibit cross-talk between the layers 84, 86 and 88.

To obtain a desired performance of the sensors it is necessary to "hardwire" the following components: (i) guard electrode 91, (ii) shielding conductor 92 in the second layer 85, (iii) shielding conductor 94b in the third layer 86, (iv) shielding conductor 92 in the fourth layer 87, (v) shielding conductor 94b in the fifth layer 88, (vi) shielding conductor comprising the sixth layer 89, in as many places as possible. In the discussed example this has been achieved by the process of "through-hole plating", while the sensors were manufactured using printed circuit board (PCB) technology. The connections are omitted in FIG. 16.

Connections between electrodes 90, connections 93 in layers 85 and 87 and signal carrying connections 94 in layers 86 and 88 were similarly made using "through-hole plating" technique.

The technique of shielding between individual layers in the "sandwich" described with reference to FIG. 16, a well as between individual signal carrying connections in layers 86 and 88 of FIG. 16 is advantageous because it allows both:

avoidance of cross-talk between signals from individual electrodes; as well as the use of each electrode as a source or detector as described with reference to FIG. 13. If the connections to the electrodes were not shielded then "cross-talk" between the sources and the detectors would be imposed on the measured signal, reducing the accuracy of measurement significantly.

The array of FIG. 16 is just one example of many possible ways of shielding the signal carrying connectors. A section through a generalised array of electrodes is shown in FIG. 17. An uppermost surface and a lowermost surface of the array are formed from laminate 97. A series of electrodes 98 are connected, through a series of shields 99 to a series of connectors 100. The number of electrodes, shields and connectors may be tailored to any required purpose.

Figure 17A:
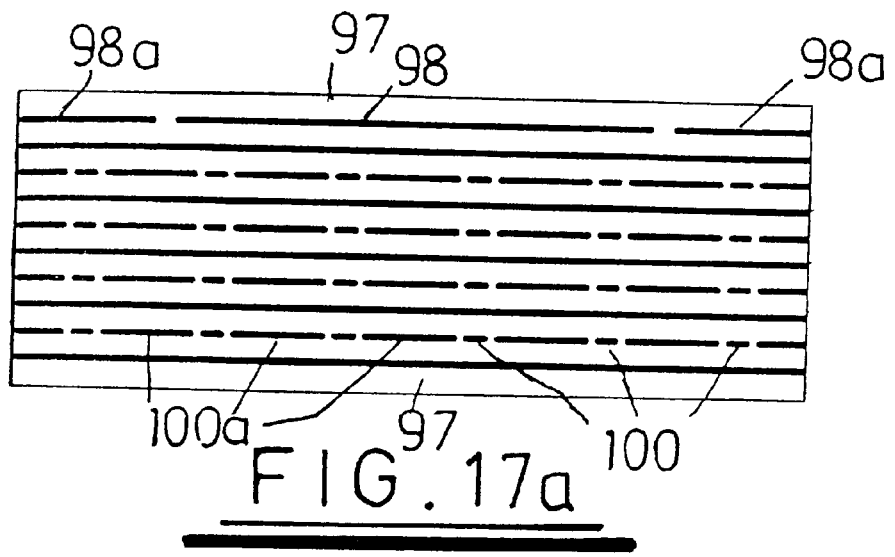
FIG. 17a illustrates schematically a more detailed cross-section of the layers shown in FIG. 17.

A generalised array of the type shown in FIG. 17 is shown in more detail in FIG. 17a. The cross-section of FIG. 17a is across a width of an array. Laminate 97 again forms the upper and lower surfaces of the array. A detection electrode 98 is provided with a guard electrode 98a at either side. A series of shielding layers 99 separate the detection electrode from a series of signal carrying connections 100. Each signal carrying connection 100 is isolated from its neighbours by separation conductors 100a.

Figure 18:
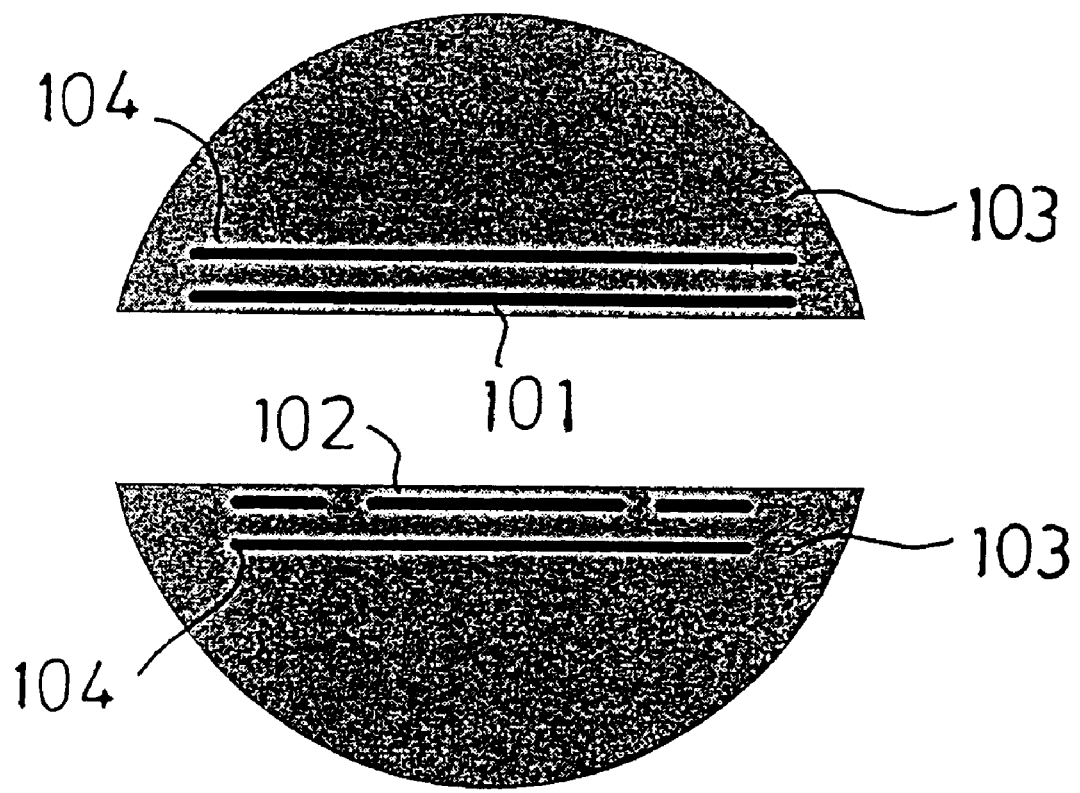
FIG. 18 is a schematic view of a cross-section through a source and a detector located in hemispherical casing.

FIG. 18 shows a source 101 and a detector 102 located on parallel faces of two parts 103 of a circular rod (middle section removed). A shield 104 is located behind both the source 101 and the detector 102. The arrangement of detector/shield in the bottom half of FIG. 18 will be probably the generalised array from FIG. 16 and 17. The supports 103 illustrated are casings which may be constructed from metal or from dielectric material. When dielectric material is used, an electric field obtained from the source 101 is closer to being a uniform field than that obtained when a metal support 103 is used.

Figure 19A:
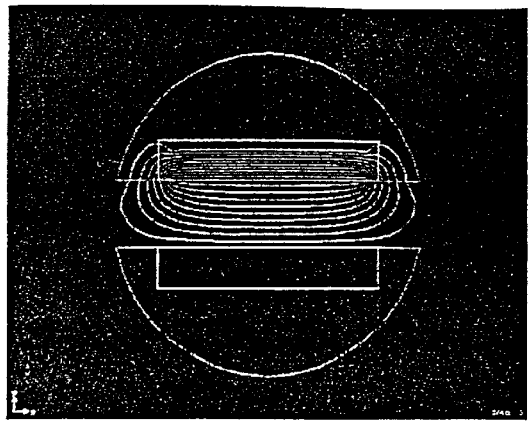
FIG. 19 is a representation of a source and a detector showing the electric field present when a voltage is applied to the source.
Figure 19C:
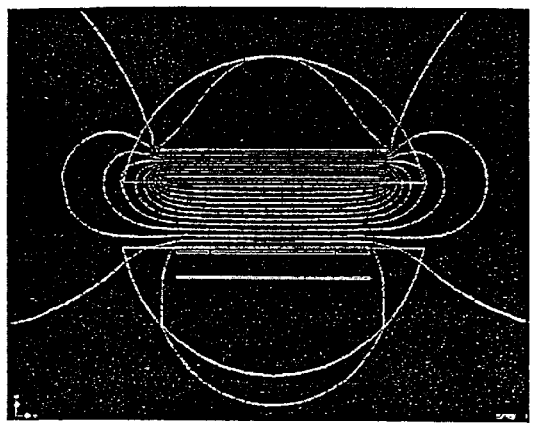
Figure 19B:
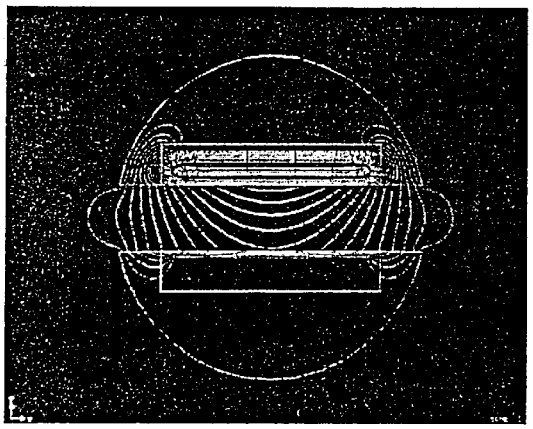
Figure 19D:
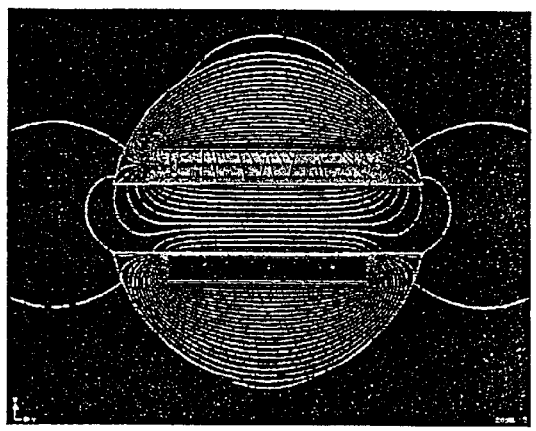

FIGS. 19a and 19b illustrate a source arid detector, of the form illustrated in FIG. 18, held in a metal casing. When the source and detector are located in air (FIG. 19a), the electric field obtained is close to parallel, but when they are immersed in water (FIG. 19b) the field degenerates significantly. Thus, as the permittivity of the media surrounding the detector and source is increased, the quality of electric field obtained is degraded. In contrast, when the source and detector are held in a dielectric casing (FIGS. 19c and 19d), the electric field obtained is close to parallel both in air (FIG. 19c) or in water (FIG. 19d). Thus, the dielectric casing is advantageous because it provides an electric field which is close to parallel when the detector and source are located in media of a range of permittivities.

Figure 20:
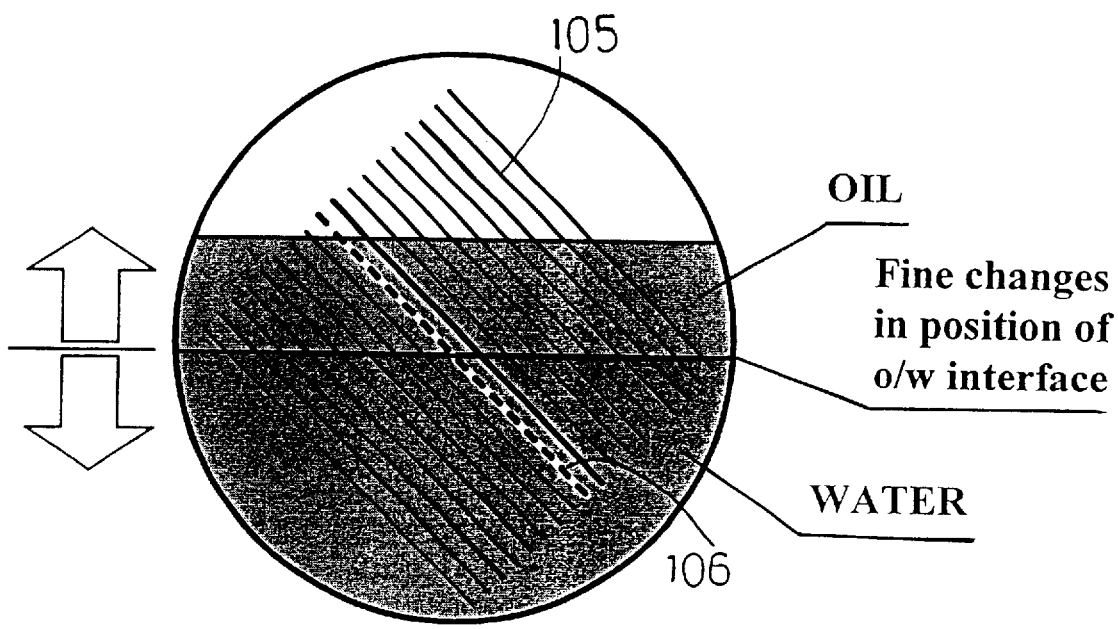
FIG. 20 is a schematic view of a cross-section through the separator vessel of FIG. 3, showing an array of capacitance sensors, and oil and water held in the vessel in separated layers.
Figure 21:
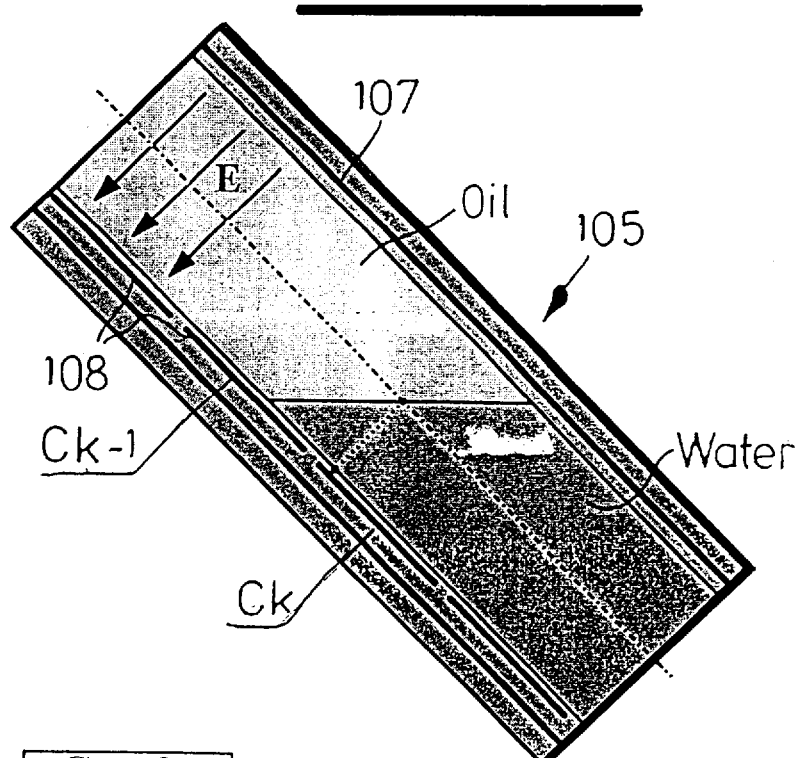
FIG. 21 illustrates a section of the array of capacitance sensors shown in FIG. 20.

FIG. 20 shows a cross-section of the separator vessel of FIG. 3, containing water oil arid air in three layers. An inclined plate separator 105 is provided with an array 106 of capacitance sensors. A section of the array 105 is illustrated in more detail in FIG. 21. An upper electrode of the array is a source 107, and the lower electrodes are a series of four detectors 108.

The array may be calibrated to allow detection of the position of the oil/water interface to an accuracy better than the height of one electrode 108. The calibration procedure comprises:

displacement of the interface, in a vertical direction, in small steps (at least a few steps per electrode height) along the entire length of the array 105;

storing the differences in readings from all adjacent pairs of electrodes (eg.: . . . $C_{k-2}-C_{k-1}$, $C_{k-1}-C_k$, $C_k-C_{k+1}$, $C_{k+1}-C_{k+2}$, . . .)

The above differences are zero (assuming that the electrodes are identical and far from "fringe" effects which occur close to ends of the array) if the pairs of adjacent electrodes 108 are immersed in the same medium (oil or water). However, when the two adjacent electrodes 108 are in different media, the difference between their readings reaches a maximum. All "intermediate" interface positions produce "intermediate" values $C_k$–$C_{k+1}$, and these a used to identify the position of the interface with a high resolution.

FIG. 22 shows a number of capacitance profiles obtained for an array comprising a series of eighteen electrodes, while an interface level was traversed across the vessel.

Figure 23:
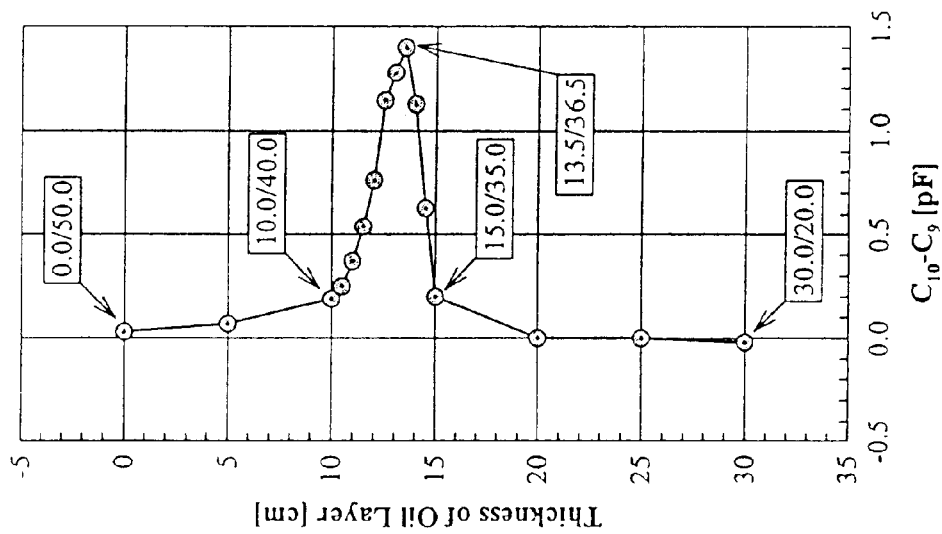
FIG. 23 is a graph representing data from FIG. 21 which data has been mathematically transformed.

FIG. 23 shows data from FIG. 22, read from two electrodes of the array. The data has been "transformed" into co-ordinates ($C_{10}$–$C_9$) versus oil layer thickness (or an arbitrary position of the interface). This "spike-like" function is unique for a given media permittivity. By looking at differences between neighbouring electrodes the position of the interface can be established to an accuracy greater than the height of one electrode.

Figure 24:
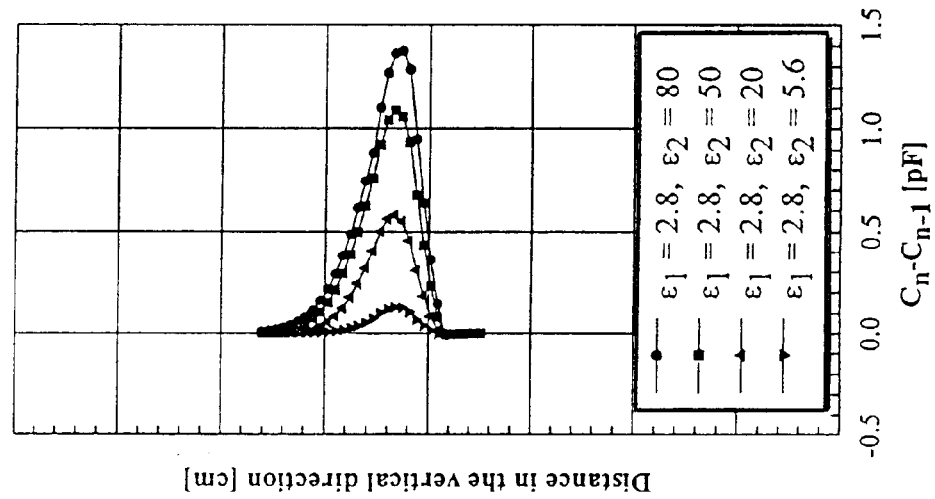
FIG. 24 is a graph representing a computer simulation corresponding to the data shown in FIG. 23.

FIG. 24 shows a computer simulation where permittivity of distilled water ($\epsilon_r$=80) was replaced by different values (50, 20 and 5.6). The character of the calibration curve remains unchanged but the maximum varies. This implies the need for separate calibrations for all combinations of media for which the sensor array is to be used.

What is claimed is:

1. A sensor array for detecting the distribution of fluids having different electrical characteristics, comprising a multilayer structure including a first layer which defines an array of spaced apart sensor electrodes, a second layer separated from the first layer by dielectric material and defining a conductive screen, and a third layer separated from the second layer by dielectric material and defining a series of spaced apart elongate connections, wherein the second layer is sandwiched between the first and third layers, each sensor being connected to a respective connection by a respective conductive path extending through an opening in the conductive screen defined by the second layer.

2. A sensor array according to claim 1, wherein the conductive paths are defined by through-hole plating structures formed through apertures in the dielectric material.

3. A sensor array according to claims 1, wherein the first layer which defines the array of sensor electrodes is covered by dielectric material.

4. A sensor array for detecting the distribution of fluids having different electrical characteristics, comprising a multilayer structure including a first layer which defines an array of spaced apart sensor electrodes, a second layer separated from the first layer by dielectric material and defining a conductive screen, a third layer separated from the second layer by dielectric material and defining a series of spaced apart elongate connections, and a fourth layer separated from the third layer by dielectric material and defining a conductive screen such that the third layer is sandwiched between the conductive screens defined by the second and fourth layers each sensor being connected to a respective connection by a respective conductive path extending through an opening in the conductive screen defined by the second layer.

5. A sensor array according to claim 4, comprising a fifth layer separated from the third layer by dielectric material and defining a conductive screen, and a sixth layer separated from the fourth and fifth layers by dielectric material and defining a further series of spaced apart elongate connections, selected sensors being connected to respective further connections by respective conductive paths extending through openings in the conductive screens defined by the second and fifth layers.

6. A sensor array according to claim 4, wherein the layers are supported on dielectric boards which define the dielectric material separating adjacent layers.

7. A sensor array for detecting the distribution of fluids having different electrical characteristics, comprising a multilayer structure including a first layer which defines an array of spaced apart sensor electrodes, a second layer separated from the first layer by dielectric material and defining a conductive screen, a third layer separated from the second layer by dielectric material and defining a series of spaced apart elongate connections, each sensor being connected to a respective connection by a respective conductive path extending through an opening in the conductive screen defined by the second layer, wherein the third layer defining elongate connections incorporates a conductive screen extending between each adjacent pair of elongate connections.

8. A sensor array for detecting the distribution of fluids having different electrical characteristics, comprising a multilayer structure including a first layer which defines an array of spaced apart sensor electrodes, a second layer separated from the first layer by dielectric material and defining a conductive screen, a third layer separated from the second layer by dielectric material and defining a series of spaced apart elongate connections, each sensor being connected to a respective connection by a respective conductive path extending through an opening in the conductive screen defined by the second layer, wherein the first layer incorporates a conductive screen spaced from the sensor electrodes and defining a series of openings, each sensor electrode being located within a respective opening.

* * * * *